United States Patent [19]
Nakanishi et al.

[11] Patent Number: 5,899,549
[45] Date of Patent: May 4, 1999

[54] LIQUID CRYSTAL DISPLAY WITH SHIELD MEMBER ARRANGED ON A ELECTROLUMINESCENT PLATE

[75] Inventors: Hideo Nakanishi; Toshiyuki Tsumura, both of Yokohama, Japan

[73] Assignee: Matsushita Electric Industrial Co., Ltd., Japan

[21] Appl. No.: 08/798,375

[22] Filed: Feb. 7, 1997

[30] Foreign Application Priority Data

Feb. 9, 1996 [JP] Japan ................................. 8-046864

[51] Int. Cl.⁶ ..................... G02F 1/1333; G02F 1/1335
[52] U.S. Cl. ................. 349/59; 349/69; 455/300
[58] Field of Search ................... 349/69, 59; 455/300

[56] References Cited

U.S. PATENT DOCUMENTS

| | | | |
|---|---|---|---|
| 4,663,670 | 5/1987 | Ito et al. | 358/245 |
| 4,975,692 | 12/1990 | Tateyama | 349/69 |
| 5,083,058 | 1/1992 | Nonomura et al. | 313/482 |
| 5,307,190 | 4/1994 | Wakita et al. | 349/158 |
| 5,357,570 | 10/1994 | Tomura et al. | 379/433 |
| 5,564,096 | 10/1996 | Hama et al. | 455/300 |

*Primary Examiner*—William L. Sikes
*Assistant Examiner*—Julie Ngo
*Attorney, Agent, or Firm*—Rossi & Associates

[57] ABSTRACT

A liquid-crystal display for use in small-sized transceivers is provided. This display includes a signal processing circuit processing a radio signal received by an antenna, a liquid-crystal driver converting an output signal from the signal processing circuit into a display control signal, a liquid-crystal plate responsive to the display control signal from liquid-crystal driver to display information thereon carried by the radio signal, an electroluminescence plate disposed between the liquid-crystal plate and the liquid-crystal driver, illuminating a bottom area of the liquid-crystal plate opposite to the display area, and a conductive shield member attached to the bottom area of the electroluminescence plate, blocking conductive coupling of the liquid-crystal plate and the liquid-crystal driver for screening the antenna from noise interfering with radio reception.

8 Claims, 3 Drawing Sheets

LIQUID CRYSTAL DISPLAY WITH SHIELD MEMBER ARRANGED ON A ELECTROLUMINESCENT PLATE

BACKGROUND OF THE INVENTION

1. Technical Field

The present invention relates generally to a liquid-crystal display for use in a small-sized radio transceiver, and more particularly to a shield attached to an EL (electroluminescence) plate connected to ground for reducing noise generated from a liquid-crystal driver, interfering with radio reception of an antenna.

2 Background of Related Art

Generally, small radio transceivers are equipped with a liquid-crystal display, a liquid-crystal driver controlling the liquid-crystal display for displaying received image information, and a shield plate covering the liquid-crystal driver.

FIG. 6 shows a typical liquid-crystal display for use in small radio transceivers which includes a liquid-crystal plate 21 for displaying characters, printed boards 22 having mounted thereon the liquid-crystal plate 21 and a liquid-crystal driver 23, an antenna 24 for receiving radio signals, and a shield plate 25 for covering the liquid-crystal driver 23, In this type of liquid-crystal display, the number of characters to be indicated on the liquid-crystal plate 21 is relatively small. The liquid-crystal plate 21 is thus designed to indicate characters over at most two lines, as shown in FIG. 6. Specifically, a large-sized display covering the whole of the radio transceiver is not required. Noise entering the antenna 24 from the liquid-crystal driver 23 can be reduced by locating the liquid-crystal driver 23 away from the antenna 24 or covering it with a shield plate so that the noise does not interfere with radio reception of the antenna 24.

However, in recent years, the transmission speed of small radio transceivers is increased for increasing information elements to be transmitted, thus requiring a large-screen display capable of indicating characters over four or more lines, for example. Additionally, the small transceivers are further required to be small and compact.

In order meet such requirements, the operational speed and performance of a CPU used in small radio transceivers have been improved, and small radio transceivers using large-sized displays capable of displaying a great deal of information have been developed. Such small radio transceivers however encounter the drawback in that a liquid-crystal driver generates noises with increase in operational speed thereof, which greatly interfere with the radio reception.

In such a small radio transceiver, a liquid-crystal driver is usually not mounted on a printed board and formed with IC chips mounted on a COB (Chip On Board) with TAB (Tape Automated Bonding), connected to a liquid-crystal plate. Thus, the interval between the COB and the liquid-crystal plate is short, and it is difficult to dispose a shield plate between the COB and the liquid-crystal plate, thus resulting in a further increase in noise.

SUMMARY OF THE INVENTION

It Is therefore a principal object of the present invention to avoid the disadvantages of the prior art.

It is another object of the present invention to provide a compact liquid-crystal display for use in small-sized radio transceivers which is designed to screen an antenna from noise generated by a liquid-crystal driver.

According to one aspect of the present invention, there is provided a liquid-crystal display which comprises: (a) an antenna receiving a radio signal; (b) a receiving circuit board having mounted thereon a receiving circuit which demodulates the radio signal received by the antenna; (c) a logic circuit board having mounted thereon a logic circuit performing a given operation on the radio signal demodulated by the receiving circuit; (d) a liquid-crystal driver converting the radio signal processed by the logic circuit into a display control signal; (e) a liquid-crystal plate having a display area and a bottom surface defined opposite the display area, the liquid-crystal plate being responsive to the display control signal from the liquid-crystal driver to display on the display area information carried by the radio signal; (f) an electroluminescence plate disposed between the bottom surface of the liquid-crystal plate and the liquid-crystal driver, illuminating the bottom surface of the liquid-crystal plate; and (g) a conductive shield member disposed between the electroluminescence plate and the liquid-crystal driver in connection with ground for blocking conductive coupling of the liquid-crystal plate and the liquid-crystal driver.

In the preferred mode of the invention, the conductive shield member is attached to a surface of the electroluminescence plate facing the liquid-crystal driver.

The conductive shield member is formed with a coating of conductive material on the surface of the electroluminescence plate facing the liquid-crystal driver. For example, the conductive shield member may be made of copper foil.

The liquid-crystal driver is mounted on a substrate. The conductive shield member has an area smaller than that of the electroluminescence plate and enough for blocking the conductive coupling of the liquid-crystal plate and the substrate completely.

According to another aspect of the invention, there is provided a liquid-crystal display which comprises: (a) an antenna receiving a radio signal; (b) a signal processing circuit processing the radio signal received by the antenna; (c) a liquid-crystal driver converting the radio signal processed by the signal processing circuit into a display control signal; (d) a liquid-crystal plate responsive to the display control signal from liquid-crystal driver to display on a display area thereof information carried by the radio signal; (e) an electroluminescence plate disposed between the liquid-crystal plate and the liquid-crystal driver, illuminating a bottom area of the liquid-crystal plate opposite to the display area; and (f) a shield member attached to the bottom area of the electroluminescence plate, blocking conductive coupling of the liquid-crystal plate and the liquid-crystal driver.

In the preferred mode of the invention, the shield member is made of a coating of conductive material on the bottom area of the electroluminescence plate.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
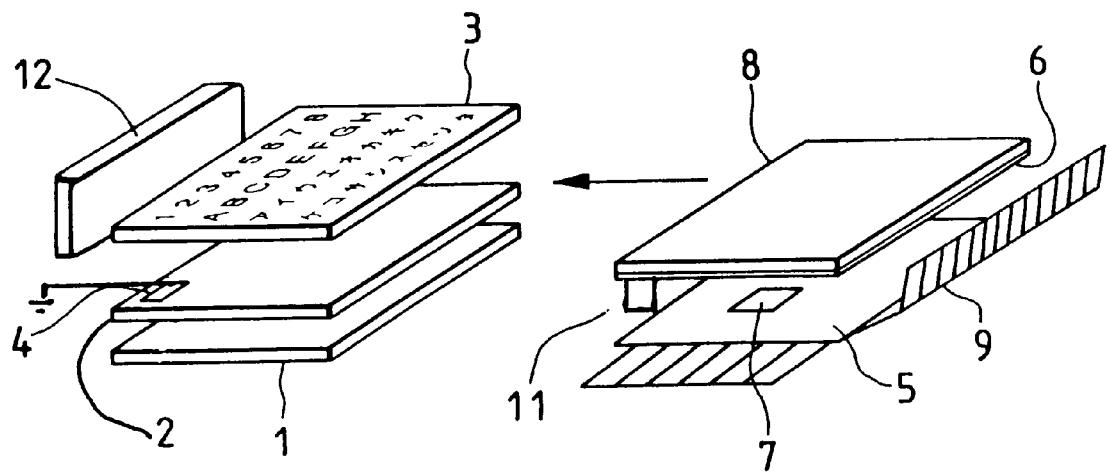
FIG. 1 is a perspective view which shows a liquid-crystal display with a shield plate according to the present invention.

Referring now to the drawings, particularly to FIG. 1, there is shown a liquid-crystal display for use in a small radio transceiver according to the present invention.

The liquid-crystal display includes generally a receiving circuit board 1, a logic circuit board 2, a liquid-crystal panel 3, an antenna 12, a COB (fin substrate) 5, a shield plate 6, a liquid-crystal driver 7, an EL (electroluminescence) plate 8, and a heat seal 9.

The receiving circuit board 1 has disposed thereon a receiving circuit which demodulates radio signals received by the antenna 12. The logic circuit board 2 has disposed thereon a logic circuit which performs logical operations on the radio signals demodulated by the receiving circuit and provides them to the liquid-crystal driver 7. The liquid-crystal driver 7 then converts the input signals from the logic circuit into control signals to control the liquid-crystal plate 3.

The logic circuit board 2 has disposed thereon a ground terminal 4 through which a ground connector 11 provided on the shield plate 6 is connected to ground. The COB 5 has disposed thereon the liquid-crystal driver 7 which is connected to the liquid-crystal plate 3 through the heat seal 9. The shield plate 6 is attached to the bottom surface of the EL plate 8 in a one-piece form and made of a conductive material which screens the antenna 12 from noise generated from the liquid-crystal driver 7. The EL plate 8 illuminates the liquid-crystal plate 3 to display information carried by the radio signals in the form of characters and/or numerals. The heat seal 9 is made of a collection of film strips which transmit the control signals of the liquid-crystal driver 7 to the liquid-crystal plate 3.

Figure 2:
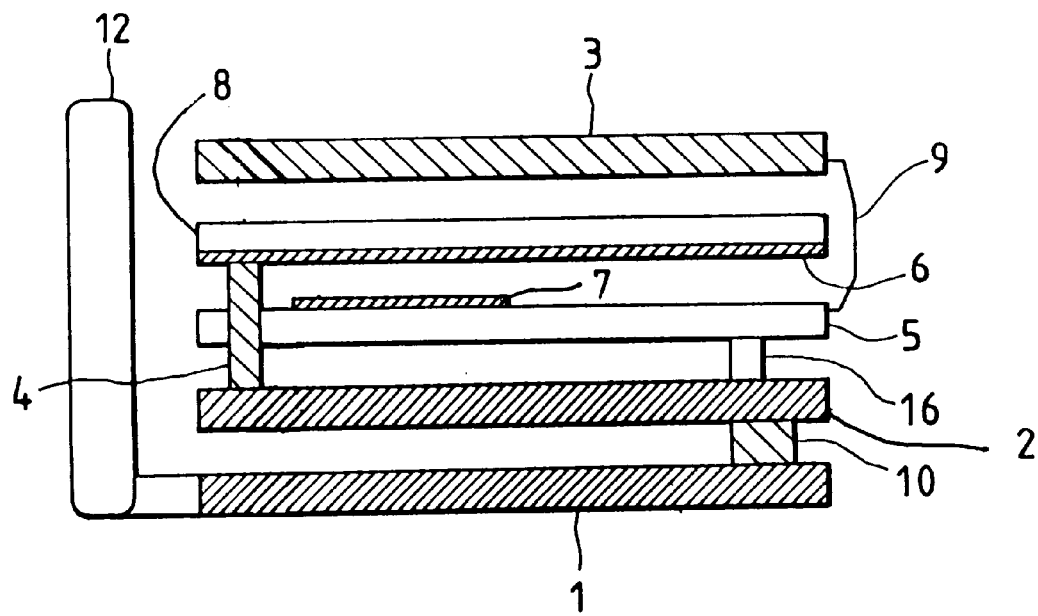
FIG. 2 is a cross sectional view which shows the liquid-crystal display of FIG. 1.

The liquid-crystal plate 3, the EL plate 8 with the shield plate 6, the COB 5, the logic circuit board 2, and the receiving circuit board I are assembled as shown in FIG. 2. A logic circuit connector 10 connects the receiving circuit of the receiving circuit board 1 with the logic circuit of the logic circuit board 2. A COB-logic circuit connector 16 connects the logic circuit of the logic circuit board 2 with the COB 5.

In operation, when radio signals are received by the antenna 12, they are first demodulated by the receiving circuit of the receiving circuit board 1 and then transmitted through the logic circuit connector 10 to the logic circuit board 2. The logic circuit of the logic circuit board 2 processes the input signals and provides them to the COB 5 through the COB-logic circuit connector 16. The liquid-crystal driver 7 mounted on the COB 5 converts the input signals into display control signals and provides them to the liquid-crystal plate 3. The liquid-crystal plate 3 displays thereon messages carried by the radio signals in the form of numerals and/or characters with aid of illumination by the EL plate 8.

Figure 3:
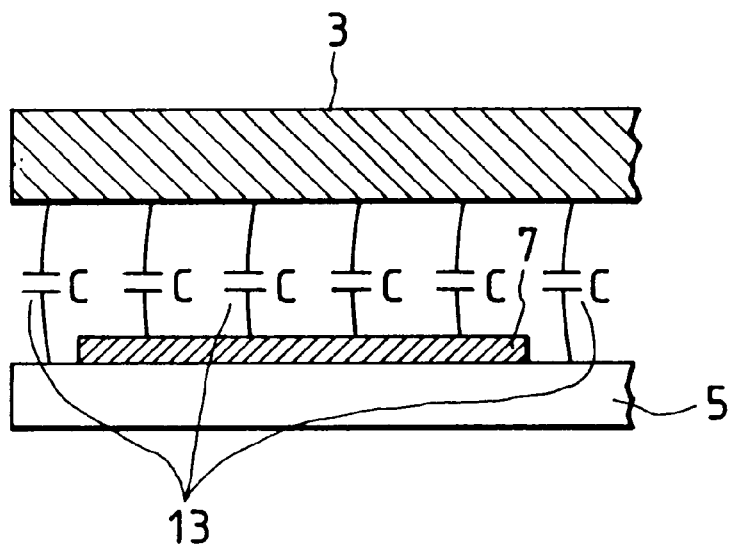
FIG. 3 is a cross sectional view which shows conductive coupling of a liquid-crystal plate and a COB having mounted thereon a liquid-crystal driver.
Figure 4:
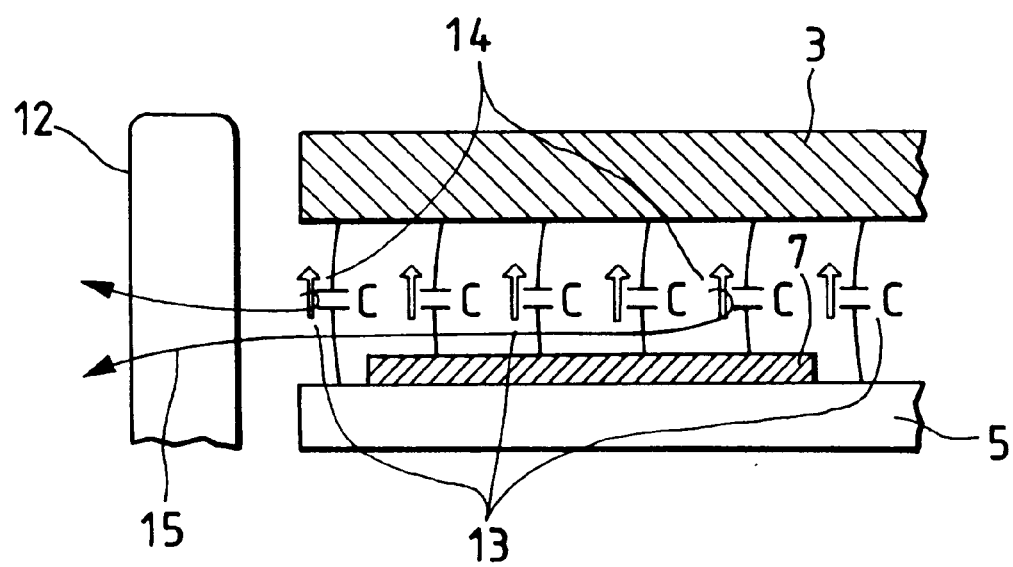
FIG. 4 is a cross sectional view which shows noise caused by the conductive coupling, as shown in FIG. 3, interfering with radio reception of an antenna.

In order to decrease the overall size and thickness of the liquid-crystal display while maintaining a large screen, it is necessary to match the sizes of the logic circuit board 2, the COB 5, and the liquid-crystal plate 3 and to arrange them close to each other. This arrangement however causes the liquid-crystal plate 3 having a certain dielectric constant to be, as shown in FIG. 3, coupled with the COB 5 capacitively since the liquid-crystal plate 3 is close to the COB 5, so that the control signals provided by the logic circuit board 2 flow as currents 14, as shown in FIG. 4, to the liquid-crystal plate 3 through capacitive couplings C13.

Figure 5:
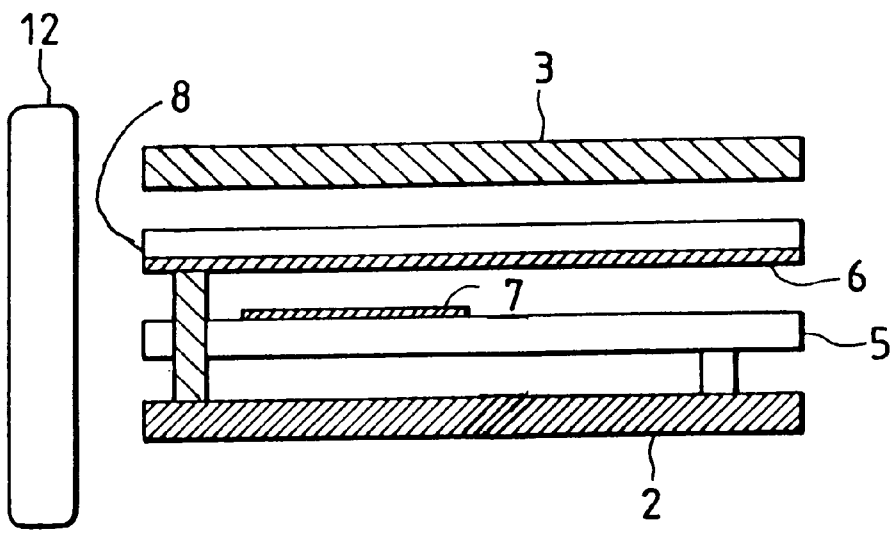
FIG. 5 is a cross sectional view which shows a liquid-crystal display of the invention.
Figure 6:
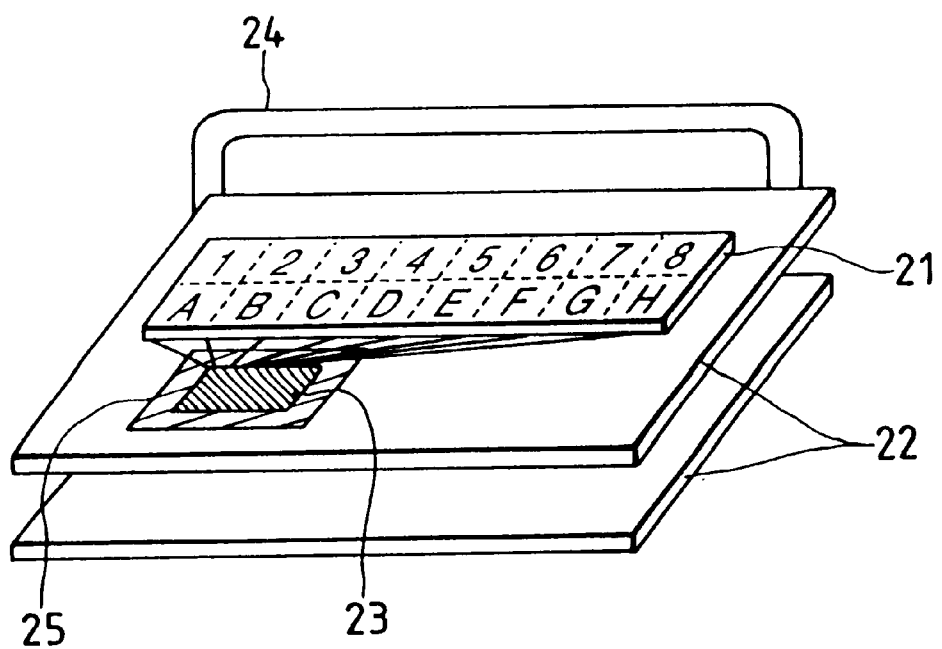
FIG. 6 is a perspective view which shows a conventional small radio transceiver with a liquid-crystal display.

When the antenna 12 is located near the liquid-crystal driver 7, it will cause the magnetic field 15 produced by the currents 14 flowing through the capacitive couplings C13 to interfere with radio reception of the antenna 12. To avoid this drawback, the liquid-crystal display of this embodiment includes the shield plate 6 attached to the bottom surface of the EL plate 8 facing the COB 5. The shield plate 6 is connected to ground through the ground terminal 4 and the ground connector 11 to inhibit the currents 14, as schematically illustrated in FIG. 5, from flowing between the COB 5 and the liquid-crystal plate 3, thereby eliminating the magnetic field 15 interfering with the radio reception of the antenna 12.

The shield plate 6 is made of metal foil such as copper foil or silver foil and bonded to the surface of the EL plate 8. The shield plate 6 may alternatively be formed by coating or depositing a conductive material such as copper, aluminum, gold, silver, or any other semiconductor on the surface of the EL plate. The size or area of the shield plate 6 may be equal to or alternatively smaller than that of the EL plate 8 so that it is located as away from the antenna 12 as possible for avoiding degradation of radio reception of the antenna.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A liquid-crystal display comprising:

an antenna receiving a radio signal;

a receiving circuit board having mounted thereon a receiving circuit which demodulates the radio signal received by said antenna;

a logic circuit board having mounted thereon a logic circuit performing a given operation on the radio signal demodulated by the receiving circuit;

a liquid-crystal driver converting the radio signal processed by said logic circuit into a display control signal;

a liquid-crystal plate having a display area and a bottom surface defined opposite the display area, said liquid-crystal plate being responsive to the display control signal from said liquid-crystal driver to display on the display area information carried by the radio signal;

an electroluminescent plate disposed between the bottom surface of said liquid-crystal plate and said liquid-crystal driver, illuminating the bottom surface of said liquid-crystal plate; and a conductive shield member arranged on said electroluminescent plate and disposed between said electroluminescent plate and said liquid-crystal driver in connection with ground for blocking conductive coupling of said liquid-crystal plate and said liquid-crystal driver.

2. A liquid-crystal display as set forth in claim 1, wherein said conductive shield member is attached to a surface of said electroluminescent plate facing said liquid-crystal driver.

3. A liquid-crystal display as set forth in claim 2, wherein said conductive shield member is formed with a coating of conductive material on the surface of said electroluminescent plate facing said liquid-crystal driver.

4. A liquid-crystal display as set forth in claim 2, wherein said conductive shield member is made of copper foil.

5. A liquid-crystal display as set forth in claim 2, wherein said conductive shield member is formed with conductive material deposited on the surface of said electroluminescent plate facing said liquid-crystal driver.

6. A liquid-crystal display as set forth in claim 2, wherein said liquid-crystal driver is mounted on a substrate, and wherein said conductive shield member has an area smaller than that of said electroluminescent plate and enough for blocking the conductive coupling of said liquid-crystal plate and said substrate completely.

7. A liquid-crystal display comprising:

an antenna receiving a radio signal;

a signal processing circuit processing the radio signal received by said antenna:

a liquid-crystal driver converting the radio signal processed by said signal processing circuit into a display control signal; a liquid-crystal plate responsive to the display control signal from liquid-crystal driver to display on a display area thereof information carried by the radio signal;

an electroluminescent plate disposed between said liquid-crystal plate and said liquid-crystal driver, illuminating a bottom area of said liquid-crystal plate opposite to the display area; and a shield member attached to the bottom area of said electroluminescent plate and a ground connection, blocking conductive coupling of said liquid-crystal plate and said liquid-crystal driver.

8. A liquid-crystal display as set forth in claim 7, wherein said shield member is made of a coating of conductive material on the bottom area of said electroluminescent plate.

\* \* \* \* \*